(12) United States Patent
Bouhanna et al.

(10) Patent No.: US 8,137,427 B2
(45) Date of Patent: Mar. 20, 2012

(54) FILTER ELEMENT WITH PLEAT SUPPORT COMBS

(75) Inventors: Greg Bouhanna, Richland, MI (US); Charles Vaillant, Kalamazoo, MI (US); Andreas Steuss, Queretaro (MX); Eduardo Garcia, Ecatepec Estado de Mexico (MX)

(73) Assignee: Mann & Hummel GmbH, Ludwigsburg (DE)

( * ) Notice: Subject to any disclaimer, the term of this patent is extended or adjusted under 35 U.S.C. 154(b) by 385 days.

(21) Appl. No.: 12/405,521

(22) Filed: Mar. 17, 2009

(65) Prior Publication Data

US 2010/0236204 A1 Sep. 23, 2010

(51) Int. Cl.
*B01D 46/00* (2006.01)

(52) U.S. Cl. ............... 55/497; 55/499; 55/501; 55/521; 55/DIG. 31

(58) Field of Classification Search ............ 55/494–495, 55/497, 499, 501–502, 511, 521, 524, 385.1, 55/529, DIG. 31; 156/73.1, 202, 204
See application file for complete search history.

(56) References Cited

U.S. PATENT DOCUMENTS

| | | | | |
|---|---|---|---|---|
| 5,840,094 A | * | 11/1998 | Osendorf et al. | ................. 65/27 |
| 5,919,122 A | * | 7/1999 | Geiger et al. | ................. 493/359 |
| 6,176,890 B1 | | 1/2001 | Svedlind et al. | |
| 6,524,479 B2 | | 2/2003 | Schwinghammer | |
| 2002/0166449 A1 | * | 11/2002 | Scanlon | .......................... 95/273 |
| 2007/0294988 A1 | * | 12/2007 | Miller et al. | .................... 55/495 |

* cited by examiner

*Primary Examiner* — Duane Smith
*Assistant Examiner* — Karla Hawkins
(74) *Attorney, Agent, or Firm* — James Hasselbeck

(57) ABSTRACT

A filter element includes support grid secured about its periphery edges to a periphery frame member. A pleated filter media is secured to the frame member and is sized and positioned to fully cover the filter fluid aperture. The support grid is positioned such that it is effective in providing support to the filter media against fluid forces. At least one elongated comb member is provided and includes a plurality of spaced tapered teeth protruding outwards towards the filter media. The teeth are sized and spaced to be received into at least a portion of grooves present between the pleats of the filter media. The teeth of the comb member are sized and spaced to regulate filter media pleat separation and spacing.

7 Claims, 4 Drawing Sheets

FILTER ELEMENT WITH PLEAT SUPPORT COMBS

TECHNICAL FIELD

The present invention generally relates to a filter element having pleated filter media and, more particularly, to an improved pleated filter element adapted to provide support to and regulate spacing of filter media pleats.

BACKGROUND OF THE INVENTION

Filter elements having pleated filter media are well known in the art. Pleated filter elements are often used to remove particulate contaminants from a gaseous fluid stream, such as in an intake air stream. Varieties of pleated filter elements find applications in automotive engine intake systems, air compressor systems as well as in other process and equipment applications where the removal of contaminants is highly desired or required.

Depending upon the filter type and application, pleated filter media may be susceptible to collapsing or folding over of pleats onto adjacent pleats due to fluid forces applied to the pleats by the filtered fluid stream. This can occur as the pleated filter media is generally made from a thin filter paper or other porous sheet media that is advantageously flexible enough to be formed into pleats. The thickness and material chosen for use as a filter media needs to have filter pores of sufficient size to pass the fluid stream while blocking passage of undesired contaminants. Generally the use of thinner rather than thicker filter media elements is preferred so as to reduce the pressure drop across the filter.

Several solutions have been developed over time to address improved support for filter pleats. In some cases a porous plastic or metallic sheet is provided as a supportive backing sheet to the filter element. This approach, while providing some support to the filter media sheets, does little to support the filter media pleats, permitting the pleats to be folded over or collapsed by the fluid forces applied to the filtration media by passage of the filtered fluid.

Another improvement is provided in U.S. Pat. No. 6,524,479 which discloses a pleated filter element including a fold support member in the shape of a rod that pierces the pleat surfaces of the folds of the filter media, thereby supportively joining adjacent pleats and regulating spacing of the pleats. This solution requires that holes for the rod be provided through the filter media, and the presence of any holes may be susceptible to leakage of unfiltered fluid around the filter media.

As can be seen, there is a need for a pleated filter element that includes a support structure configured to resist fluid forces so as to retain filter media pleats in a spaced and fully erect arrangement and that overcomes limitations of the prior art.

SUMMARY OF THE INVENTION

One object of the present invention is to provide an improved pleated filter element having elements included to regulate the spacing of filter media pleats.

Another object of the present invention is to provide an improved pleated filter element that includes features providing additional support to the filter media to resist forces induced on the filter media by the filtered fluid stream.

Another object of the present invention is to provide a pleated filter and support structure that enables the use of deep filter pleats as deep pleats provide additional filtration surface area and additional flow capacity in a given size filter housing while also increasing the capacity of the filter element to entrap dust or dirt removed from the fluid stream by the filter media.

In one aspect of the invention, a filter element has a pleated filter media circumferentially surrounded by a supporting frame member that defines an aperture for fluid flow therethrough. A support grid is provided and secured about its periphery edges onto the frame member. The support grid extends across the aperture. The pleated filter media is secured to the frame member and is sized and positioned to fully cover the aperture such that fluid flowing through the aperture is constrained to be filtered by the filter media. The support grid is positioned at a downstream side of the filter media and positioned such that it is effective in providing support to the filter media against fluid forces. At least one elongated comb member is provided on the support grid and extends across at least a portion of the aperture. The comb member or members include a plurality of spaced tapered teeth protruding outwards towards the filter media. The teeth are sized and spaced to be received into at least a portion of grooves present between the pleats of the filter media. The teeth of the comb member are sized and spaced to regulate filter media pleat separation and spacing while providing support to the pleats.

In another aspect of the invention, the frame element includes an elastomeric seal.

In another aspect of the invention, the elastomeric seal comprises polyurethane.

In another aspect of the invention, the teeth are uniformly sized and spaced along the comb.

In another aspect of the invention, the support grid further comprises edge rails extending about periphery edges of the support grid with the edge rails securing the support grid to the frame member.

In another aspect of the invention, the comb members are positioned at an angle greater than zero degrees and less than forty five degrees relative to the pleats of the filter media.

In another aspect of the invention, the comb members are positioned at an angle substantially perpendicular to the pleats of the filter media.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
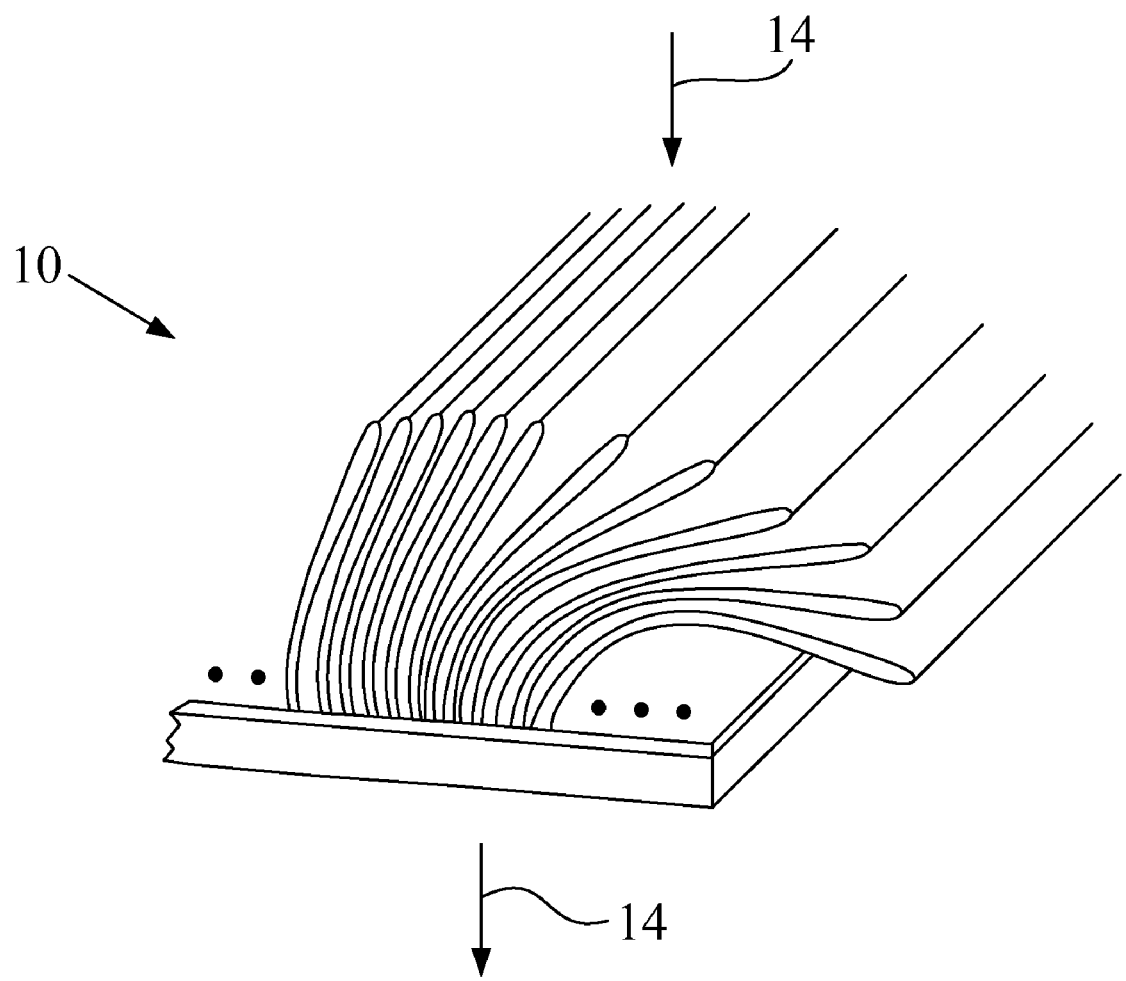
FIG. 1 is a schematic side view of a prior art pleated filter element.

In prior art pleated filter elements 10, such as schematically illustrated in the partial side view in FIG. 1, forces induced on the pleats 12 by the fluid stream 14 may tend to bend or collapse the pleats 12 onto each other. As is well known, pleated filter media is generally made from filter paper or other porous sheet media that is advantageously flexible enough to be formed into pleats. The flexibility of the pleats 12 in the filter media may allow forces induced in the pleats 12 by the fluid stream 14 to flatten and compress the pleats 12, thereby reducing filter fluid flow capacity and increasing pressure drop across the filter element 10.

Figure 2:
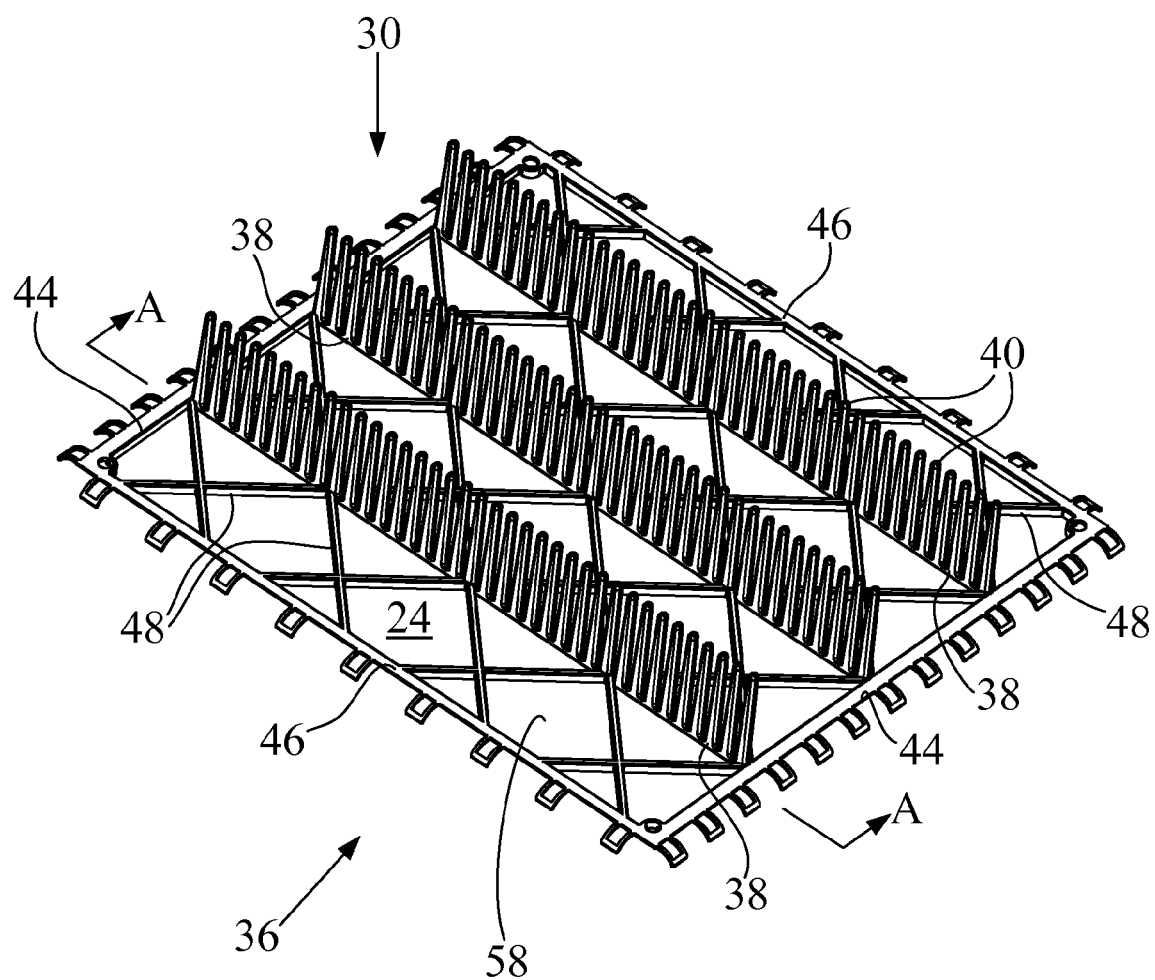
FIG. 2 is a perspective view of the upstream side of a support grid provided with a plurality of comb members for supporting pleated filter media in a filter element, consistent with the present invention.
Figure 3:
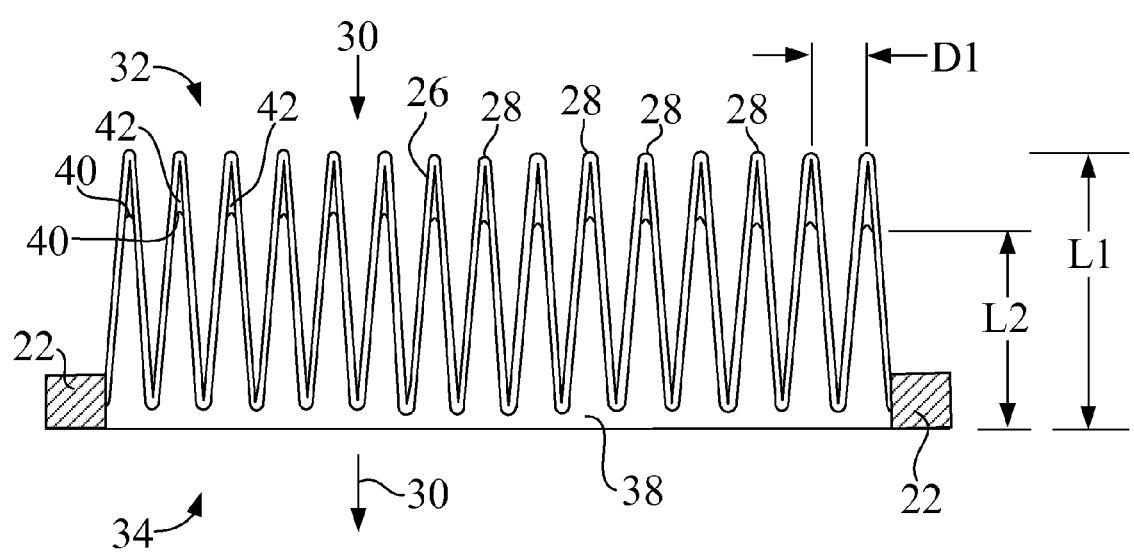
FIG. 3 is a schematic sectional illustration of support grid comb members supporting pleats in a filter media, generally arranged according to section lines A-A of FIG. 2.

FIG. 2 is a perspective view of the upstream side of a support grid 50 including a plurality of comb members 38 for regulating pleat spacing and supporting pleats of said pleated filter media in a filter element, consistent with the present invention. FIG. 3 is a schematic sectional illustration of a support grid comb member supporting pleats of an overlaid filter media, generally arranged according to section lines A-A of FIG. 2. The support grid 36 includes a plurality of spaced and cross-wise arranged elongated web members 48 extending between and secured to peripheral edge rails 44 and 46. The web members 48 are comprised of a material that is substantially rigid and resists flexure. Web members 48 extend across the aperture 24 defined by the edge rails 44 and 46. The web members extend through and divide the aperture 24 into a plurality of openings 58 that are of ample size to pass the fluid stream 30 essentially without restriction while providing required support to the filter media. The peripheral edge rails 44 and 46 serve as a support and mounting frame for the elongated web members 48 of the support grid 50. In the illustrated embodiment, a plurality of comb members 38 are provided in a spaced parallel relationship, secured to and extending across web members 48. In the illustrated embodiment, the comb members 38 extend to and secure to opposing edge rails 44 of the support grid 36. Each comb member 38 includes a plurality of spaced tapered teeth 40 arranged to protrude outwardly from the comb member 38 in a direction towards the upstream side 32 of the support grid 36. The teeth 40 are sized and spaced to be received between and to provide support to the pleats 28 of the filter media 26. The comb members 38 and teeth 40 comprise materials selected to have sufficient rigidity to provide support to the pleats 28 against fluid forces without undue flexure.

In certain aspects of the invention, the comb members 38 extend fully across the fluid flow aperture 24 as defined between the edge rails 44 and 46 of the support grid 38. In some aspects of the invention, the combs may be positioned substantially at right angles to the pleats 28.

FIG. 3 schematically illustrates the pleats 28 of the filter media 26 laid over or supportively received onto the teeth 40 of the comb member 38. As illustrated in FIG. 3, the teeth 40 have a tooth to adjacent tooth spacing D1 that corresponds to the desired pleat to pleat spacing D1. The tooth to tooth spacing D1 regulates the spacing of the pleats 28 of the filter media 26.

Although the grid member 36 provides support to the pleated filter media 26, the grid member may not be sufficient to maintain the pleats 28 in a spaced erect configuration such as depicted in FIG. 3. Instead, forces induced in the filter media 26 by fluid stream 30 may be sufficient to compress or flatten the pleats in a fashion such as discussed and illustrated previously with FIG. 1.

Therefore and advantageously, the present invention includes at least one comb member 38 secured to the support grid 36 extending across at least a portion of the aperture 24 defined by the edge rail sets 44 and 46. Each comb member 38 includes a plurality of spaced tapered teeth 40, generally protruding outwards from the comb member in a direction towards the upstream side 32 of the filter element 20. The teeth 40 are sized and spaced to be received between and provide support to the pleats 28 of the filter media 26. The comb member 38 and teeth 40 include materials selected to have sufficient rigidity to provide support to the pleats 28 without undue flexure. In preferred embodiments, the comb member 38 extends fully across the aperture 24. In some preferred embodiments, the comb members 38 are positioned substantially at right angles to the pleats 28. In other embodiments, the comb members 38 are positioned at an angle greater than zero degrees and up to forty five degrees relative to pleats 28. Preferably the length 'L2' of the teeth is selected according to the pleat depth 'L1' of the filter media 26 such that the teeth, when fully inserted into grooves 42 between the pleats, have a length 'L2' sufficient to maintain the pleats 28 fully extended in their erect position (substantially at length 'L1').

Advantageously, the teeth 40 provide support to the pleats 28 to maintain the pleats fully erect and prevent the compression and collapse of the pleats as discussed earlier with the prior art of FIG. 1.

Advantageously, the structure of the support grid 36, particularly the elongated web members 48, is configured and adapted to provide structural support to the filter media 26 and pleats 28 whereby the pleats 28 do not appreciably deform when acted upon by forces induced by fluid stream 30. As can be seen in FIG. 3, as fluid stream 30 flows into the filter media 26, fluid forces tend to press the pleats 28 against the teeth 40 of the comb member 38. The teeth 40, being substantially rigid, act to support the pleats 28 in a fully erect position (as illustrated in FIG. 3) and regulate the pleat to pleat spacing D1.

The teeth 40 are spaced along the comb member 38 at a tooth to tooth spacing D1 selected to match with the desired pleat to pleat fold spacing D1 of pleats 28, such that the teeth 40 are easily positioned into the grooves 42 between adjoining pleats. Preferably the length 'L2' of the teeth is selected according to the pleat depth 'L1' of the filter media 26 such that the teeth, when fully inserted into grooves 42 between the pleats, have a sufficient length to maintain the pleats 28 fully extended in their erect position. To support the pleats, the teeth 40 do not need to fully extend to the pleat depth L1, but may instead extend far enough into the grooves 42 such that the remaining distance above the teeth 40 to the tip of the pleats (L1-L2) is sufficiently short such that inherent rigidity properties of the filter media 26 are sufficient to support the pleats 28 in an erect position as illustrated in FIG. 3.

Figure 4:
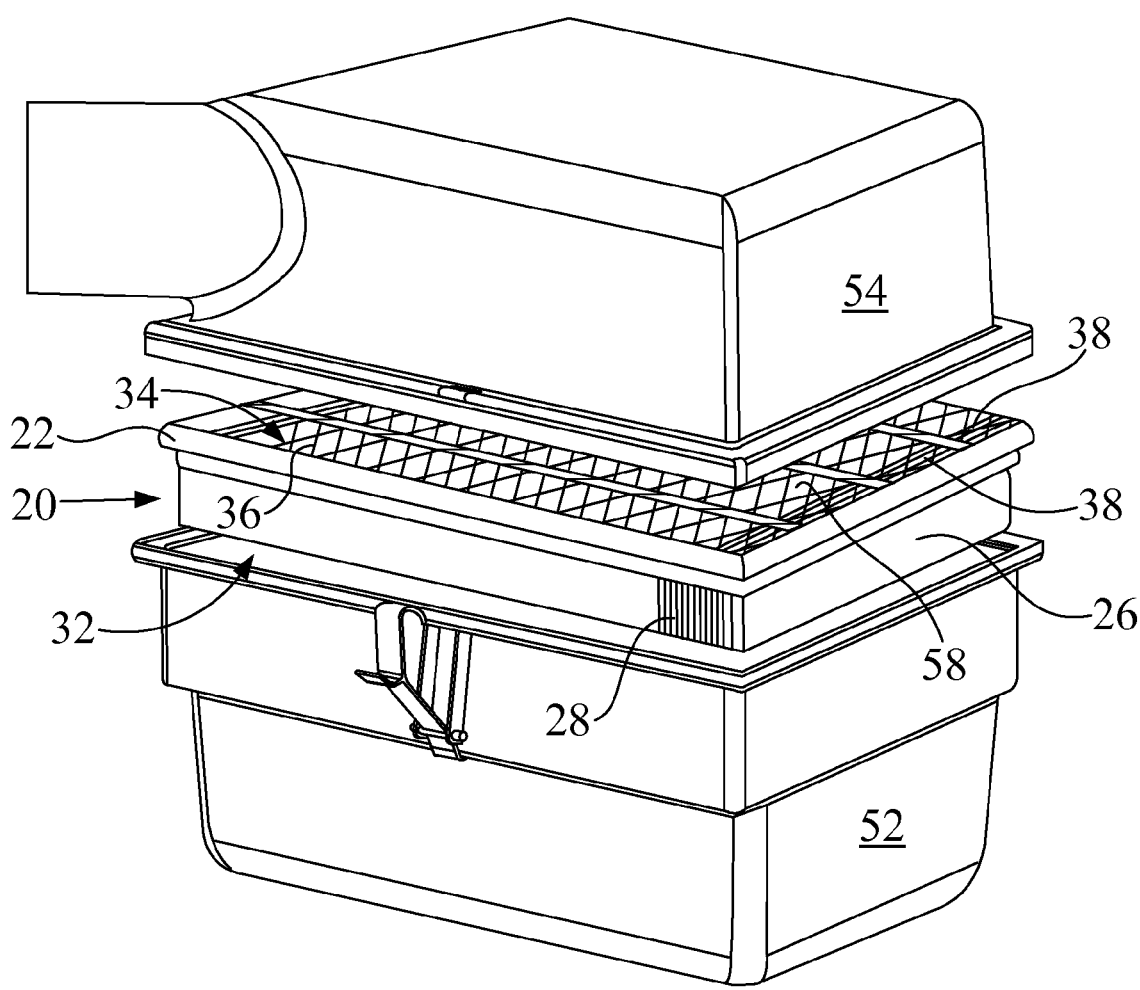
FIG. 4 is a perspective view of a pleated filter element including a support grid with pleat support comb members configured to install into a filter housing, consistent with the present invention.

FIG. 4 is a perspective view of one exemplary embodiment of a pleated filter element 20 with comb members 38 configured to support pleats 28 of the filter element 20 in a fashion as discussed previously with FIGS. 2 and 3. The filter element 20 is sized and configured for installation into a filter housing, such as the illustrated lower housing 52 with closable cover 54.

In some embodiments, the filter element 20 may utilize what is known in the art as "deep pleat" technology. In "deep pleat" technology, the pleats 28 may have a pleat depth 'L1' of greater than 3 inches. For example, deep pleats of 8 inches may be utilized with such a design. Such deep pleats are particularly susceptible to collapse and distortion due to fluid forces and therefore particularly benefit from the use of comb members as in the present invention. The ability to provide and support deep pleats is particularly advantageous to filter element design as deep pleats provide additional filtration surface area to a given frame size, thereby lowering pressure drop across the filter element and extending the service life between change outs.

In FIG. 4, the pleated filter element 20 includes a frame member 22 defining an aperture 24 therethrough. The frame member 22 may be sized and configured to be received into a filter housing, for example lower housing 52 and upper housing 54. The frame member 22 may comprise an elastomeric seal positioned to interface against and seal against a seal ledge 56 or wall within the filter housing 52, 54. In an aspect of the invention the elastomeric seal comprises polyurethane. In certain aspects of the invention, the frame member 22 may consist almost entirely of polyurethane. Polyurethane is a resilient material that is suitable for air filter applications.

At least one porous filter media layer 26 is formed into a pleated or zigzag folded shape and secured along periphery portions to the frame member 22. The pleated filter media 26 is sized to fully cover the aperture 24 such that the filtered fluid stream 30 is confined to flow through the filter media 26 to pass from the upstream side 32 to the downstream side 34 of the filter element 20. In this way, the filter media 26 can be effective in removing particulates from the fluid stream 30.

A support grid 36 is provided at a downstream side 34 of the pleated filter media 26 and is generally secured along its periphery portions to the frame member 22. Advantageously, support grid 36 is configured and adapted to provide support to the pleated filter media 26 to assist in resisting forces induced on the filter media 26 by fluid stream 30.

Although the grid member 36 provides support to the pleated filter media 26, the grid member may not be sufficient to maintain the pleats 28 in a spaced erect configuration such as depicted in FIG. 4. Instead, forces induced in the filter media 26 by fluid stream 30 may be sufficient to compress or flatten the pleats in a fashion such as discussed and illustrated previously with FIG. 1.

It should be understood, of course, that the foregoing relates to exemplary embodiments of the invention and that modifications may be made without departing from the spirit and scope of the invention as set forth in the following claims.

The invention claimed is:

1. A filter element, comprising:
 a frame member defining an aperture for fluid flow therethrough;
 a pleated filter media secured to said frame member and fully covering said aperture;
 a support grid as a separate component from said frame member and positioned on a downstream side of said filter element and having a second fluid flow aperture aligned with said frame member fluid flow aperture, said support grid including
  a plurality of edge rails extending circumferentially around an outer boundary of said second aperture, wherein said edge rails are secured to said frame member;
  a plurality of elongated web members extending across said second aperture and secured at opposing ends to said edge rails, said web members dividing said second aperture into a plurality of fluid flow openings;
 at least one comb member extending across and secured onto at least a portion of said web members, said at least one comb member arranged in a spaced parallel arrangement on said web members, each of said at least one comb member including
  a plurality of spaced apart tapered teeth protruding from said web members towards and received into at least a portion of grooves between said pleats of said filter media;
 wherein said comb member teeth are sized and spaced to be received into at least a portion of grooves between said pleats of said filter media;
 wherein said at least one comb member is sufficiently rigid to support said filter media against forces induced on said filter media by said fluid flow without undue flexure;
 wherein said comb member teeth are spaced to regulate filter media pleat separation and spacing.

2. The filter element of claim 1, wherein said frame element includes an elastomeric seal.

3. The filter element of claim 2, wherein said elastomeric seal comprises polyurethane.

4. The filter element of claim 1, wherein said teeth are uniformly sized and spaced.

5. The filter element of claim 1, wherein said comb members are positioned at an angle greater than zero degrees and less than forty five degrees relative to said pleats.

6. The filter element of claim 1, wherein said comb members are positioned at an angle substantially perpendicular to said pleats.

7. The filter element of claim 1, wherein
 said at least one comb member extends to and has opposing ends secured to edge rails of said support grid.

* * * * *